United States Patent [19]
Halpern

[11] 4,168,583
[45] Sep. 25, 1979

[54] NUMBER BOARD APPARATUS

[76] Inventor: Rene J. Halpern, 658 Smoketree Way, Sunnyvale, Calif. 94086

[21] Appl. No.: 854,978

[22] Filed: Nov. 25, 1977

[51] Int. Cl.$^2$ .................... G09B 19/02; G09B 1/04
[52] U.S. Cl. .................................. 35/31 D; 35/31 G; 35/70
[58] Field of Search ............ 35/30, 31 R, 31 D, 31 F, 35/31 G, 32, 70, 72

[56] References Cited
U.S. PATENT DOCUMENTS

| | | | |
|---|---|---|---|
| 777,268 | 12/1904 | Thompson | 35/70 |
| 1,173,298 | 2/1916 | Montessori | 35/72 |
| 1,826,034 | 10/1931 | Williamson | 35/31 D |
| 2,502,238 | 3/1950 | Wade et al. | 35/31 F |
| 3,077,677 | 2/1963 | Malkin et al. | 35/31 D X |
| 3,189,350 | 6/1965 | Hopkins | 35/31 D X |
| 3,423,849 | 1/1969 | Jordan et al. | 35/30 |
| 3,721,020 | 3/1973 | Martin | 35/35 H |
| 3,811,206 | 5/1974 | Gaccetta | 35/35 H |
| 3,837,096 | 9/1974 | Sterling | 35/31 D |
| 3,871,114 | 3/1975 | Honig | 35/31 D |

FOREIGN PATENT DOCUMENTS 165862  2/1934  Switzerland ............ 35/31 D

*Primary Examiner*—William H. Grieb
*Attorney, Agent, or Firm*—Schatzel & Hamrick

[57] ABSTRACT

A number board apparatus for teaching beginning set and number theory to young or educationally handicapped children and including a carrying tray having a generally rectangular base with an upright sidewall rising from each of its edges, a plurality of work blocks freely slideable on a top surface of the base until contacting a sidewall or another block, each work block having indentations in the form of a numeral and/or a rectangle which are receptive to removable numeral or rectangular unit marker pegs, respectively. Several optional members such as covering boards and specialized work blocks may also be used with the number board apparatus.

7 Claims, 6 Drawing Figures

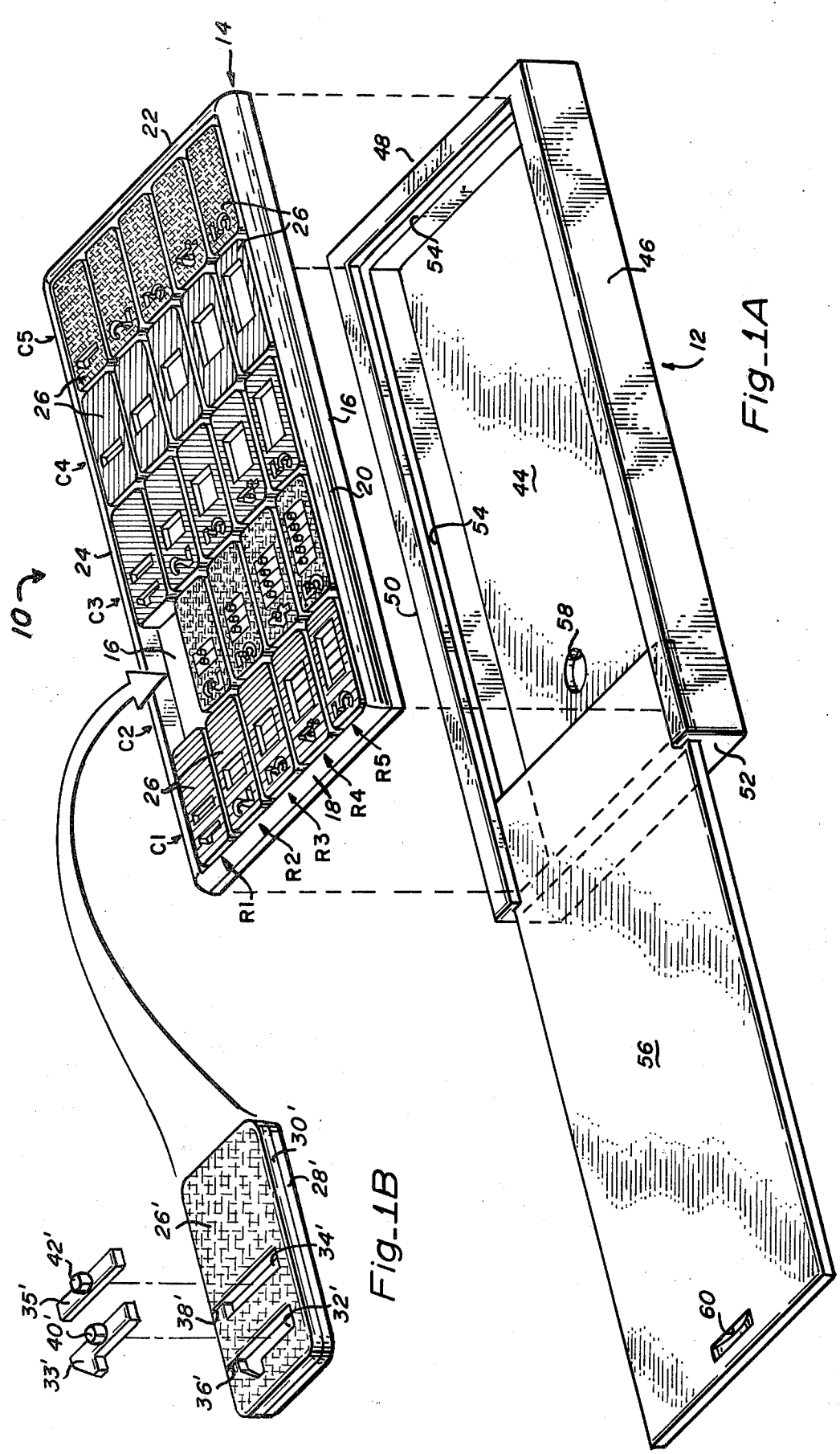

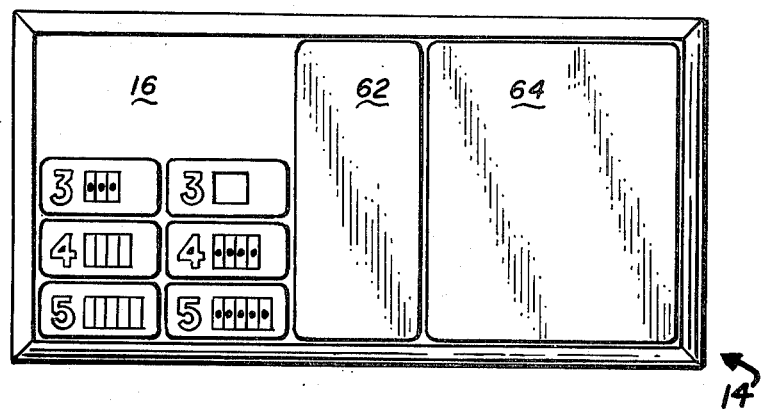
Fig_2
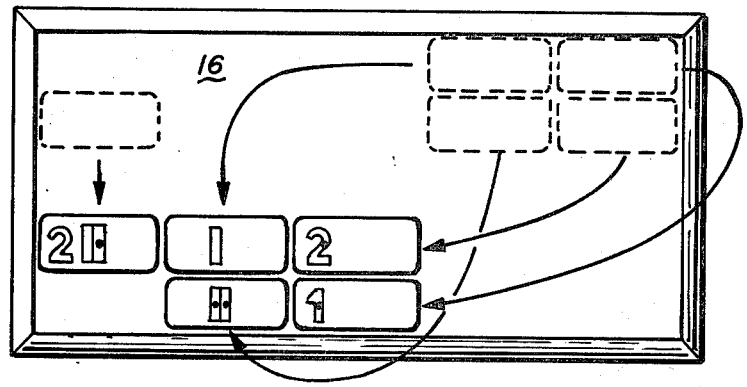
Fig_3
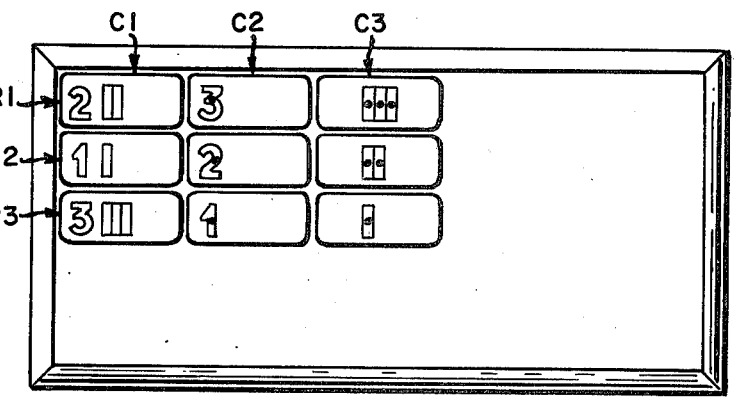
Fig_4
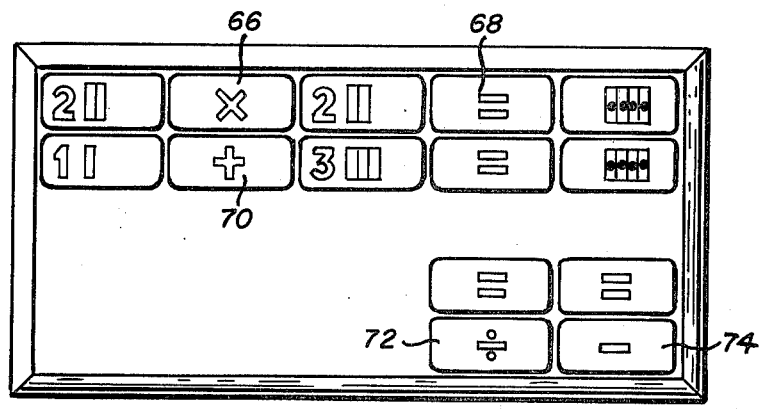
Fig_5

NUMBER BOARD APPARATUS

BACKGROUND OF THE INVENTION

1. Field of the Invention

This invention relates generally to educational devices and more particularly to educational devices which use pegs and peg boards for teaching number and set theory.

2. Description of the Prior Art

Quality of education is a subject that is much talked about in recent years. Due to increasingly crowded school rooms and to school budget reductions, there is serious doubt as to whether children are being effectively taught.

Low cost and effective educational tools that are usable by children with a minimum of teacher supervision would help alleviate the educational problem. A number of patents in the prior art, notably U.S. Pat. No. 777,268 of T. W. Thompson, U.S. Pat. No. 1,173,298 of M. Montessori, U.S. Pat. No. 3,721,020 of H. Martin and U.S. Pat. No. 3,811,206 of R. Gaccetta all disclose such educational tools.

Thompson discloses a board having a number of geometrically-shaped blocks with numerals, sets and number names printed on their upper surfaces. When a child finds two or more blocks with mating geometrical surfaces, he learns to correlate the number, name and set represented thereon.

Montessori discloses an educational device for teaching basic theories of geometry including a work block having one or more geometrically-shaped recesses or indentations in which a plurality of pegs, also geometrically shaped, may be inserted. In this way the child is taught how to subdivide an often complex geometrical shape into its simpler component parts, such as rectangles and triangles.

Martin discloses a large work board having rectangularly-shaped, color coded indentations receptive to cube-shaped blocks having letters or other indicium printed on each of their six faces. The blocks may be inserted into the indentations to form words or may be manipulated in other educational manners.

Gaccetta discloses a work board having raised portions in the form of sequential arabic numerals and further having blocks with letters printed on an upper face and having a recess or indentation on the bottom face which may mate with the raised numerals on the work board.

All of these inventions are good in that they seem relatively inexpensive to manufacture and that they teach specific skills such as addition, number recognition, geometric shape recognition and spelling without the need for direct teacher supervision. The prior art, however, does have two outsanding deficiencies.

A first deficiency is that the educational devices are not specifically designed to provide both tactile-kinesthetic and visual sensory exercise during the learning process. Combining the two sensory modalities is very important for small children since their visual conceptualizations are not always as fully developed as their tactile-kinesthetic conceptualizations.

A second problem with the teaching devices previously disclosed is that the number of educational games that they make possible are limited, thus leading to a quickly bored child and to a substantially shortened educational lifetime for the device.

SUMMARY OF THE INVENTION

It is therefore an object of this invention to provide a number board apparatus for teaching basic mathematical concepts which is inexpensive to produce and rugged in construction.

Another object of this invention is to provide a number board apparatus which lends itself to a variety of educational games of varying difficulty, thus relieving possible boredom in the user and prolonging its educational lifetime.

Briefly, the number board apparatus of the present invention includes a tray having a generally rectangular base bordered along its edges by four upright sidewalls, a plurality of work blocks disposed on the upper surface of the base, each block having indentations in the shape of numerals and/or rectangles formed in its top surface, a plurality of numeral pegs to be matched with a corresponding numeral indentations, a plurality of unit marker pegs to be disposed in the rectangular indentations and a first and second covering board which may be disposed over a predetermined number of the work blocks to visually and physically remove them from active consideration by the user.

A material advantage of the present invention is that by having a plurality of discrete work blocks to manipulate a large number of learning exercises may be invented by the child, thereby reducing boredom.

These and other objects and advantages of the present invention will become apparent upon the reading of the following detailed description as illustrated in the several figures of the drawing.

IN THE DRAWING

FIG. 1A is an exploded perspective showing a number board apparatus and container therefor in accordance with the present invention;

FIG. 1B is an enlarged perspective view further illustrating a block, unit peg and numeral peg of the type depicted in FIG. 1A;

FIGS. 2, 3 and 4 illustrate use of the apparatus shown in FIG. 1A; and

FIG. 5 illustrates an alternative embodiment of the present invention.

DETAILED DESCRIPTION OF THE PREFERRED EMBODIMENT

A number board apparatus 10 and its associated carrying case 12 are illustrated in perspective view in FIG. 1A. The drawing in FIG. 1 is shaded to show coloration of the various sets of blocks. Note that the conventional shading lines and hatching are oriented relative to the drawing page rather than the depicted apparatus. For example, the shading of the blocks in column C4 is in the form of parallel horizontal lines, representing the color blue. Number board apparatus 10 includes a carrying tray 14 having a generally rectangular base 16. Base 16 in the present embodiment is formed from thin-sheet plywood and has smooth and splinter-free top and bottom surfaces and side edges. Tray 14 also includes four sidewalls 18, 20, 22 and 24 rising from the edges of the base to form a four-sided border.

Disposed upon the upper surface of base 16 are a plurality of work blocks 26. In the present embodiment, 25 work blocks are arranged in five parallel rows R1, R2, R3, R4 and R5 and five parallel columns C1, C2, C3, C4 and C5.

The work blocks are typified by a block 26', illustrated in perspective view in FIG. 1B, which would normally reside in the space corresponding to row R1, column C2. In the present embodiment block 26' is of two-ply construction having a lower ply 28' and an upper ply 30'. Lower ply 28' is a generally rectangular, solid piece of a quarter-inch masonite with all sharp corners safely rounded off. Ply 30' is constructed of the same material and has the same dimensions and general configuration as ply 28' but is provided with two indentation-forming voids 32' and 34'. In the present embodiment, the voids are formed by cutting out pegs 33' and 35' with a coping saw or the like. Narrow slots 26' and 38' are formed by the blades of the coping saw in preparation for cutting out voids 32' and 34', respectively.

After ply 30' is cut and formed it is attached to ply 28' usually by a suitable adhesive, to form a finished work block. Voids 32' and 34' form the numeral and rectangular indentations, respectively, of the work block. Cut-out pegs 33' and 35' which mate with the identations, are provided with knobs 40' and 42', respectively, to make them easier to pick up and handle. Preferably, the knobs are small, generally cubical appendages attached to the pegs with a thin wooden pin. The knobs may also comprise short wooden dowels glued or otherwise attached to the pegs.

Each work block of the present invention represents a unique combination of color and indentations. More specifically, each column has work blocks painted a different color and each row has work blocks provided with numeral and/or rectangular indentations representative of a different number.

The colors of the work blocks were carefully chosen as being easily recognizable and nameable by small children. Column C1 has work blocks painted green, column C2 has work blocks painted yellow, column C3 has work blocks painted red, column C4 has work blocks painted blue and column C5 has work blocks painted orange.

The blocks in successive rows represent successive numerals. In the present embodiment, R1 has indentations representative of the number 1, row R2 has indentations representative of the number 2, and so on for rows R3, R4 and R5.

It will also be noted that the combination of numeric and rectangular indentations on the work blocks varies from column to column. In column C1, the work blocks have numeral-shaped indentations and rectangular-shaped indentations which have lines painted on their bottom surfaces as an indication of where the unit pegs should go. Column C2 has work blocks with both numeral-shaped indentations and rectangular-shaped indentations. The work blocks in column C3 are similar to the work blocks in column C1 in every respect except color. The work blocks in column C4 have only unlined rectangular indentations receptive to unit pegs. The work blocks in column C5 have only numeral-shaped indentations.

The columns are arranged in order of increasing conceptual difficulty so that, for example, the number concept presented in column C5 is generally more difficult for a child to learn than the concepts introduced in any of the lower numbered columns. Similarly, the learning difficulty increases with higher numbered rows because, for example, it is more difficult for a child to learn and use the number 3 than the number 1.

A carrying case 12 associated with the number board apparatus has a generally rectangular base 44 and four perpendicularly rising sidewalls 46, 48, 50 and 52. Sidewall 53 is shorter than the other sidewalls by approximately half an inch. A groove 54 is cut in walls 46, 48 and 50 at the level of the top of sidewall 52. A cover 56 may slide within slot 54 and thus close the carrying case. Number board apparatus 10 may be disposed on base 44 within the carrying case and the cover slid into the slot to securely retain the apparatus therein. A hole 58 is provided in base 44 so that a finger may be inserted therethrough from the bottom of the case to tilt the number board apparatus at an angle for easier removal. A finger recess 60 is provided in the cover so that the user may more easily open and close it.

Referring now to FIG. 2 a first covering board 62 and a second covering board 64 are shown. The covering boards are substantially rectangularly shaped, thin planar members which, in this preferred embodiment, are constructed from ¼ inch masonite press-board or the like. The corners of the covering boards are rounded to remove sharp edges.

Covering board 62 is substantially the width of a single work block and is slightly less in length than the width of carrying tray 14. Covering board 64 is of the same length as covering board 62 but is twice its width. The boards are operative to remove the covered blocks from active consideration by the child.

Also, in this figure, four blocks are shown to be removed from the tray's surface. Consequently, the child is to learn the numbers 3, 4, and 5 only in this particular educational exercise. Board 62 and 64 may be lifted and moved to cover any combination of columns so that many learning exercises, as adapted to the child's particular abilities, may be devised.

Referring now to FIG. 3, all but five of the blocks have been removed to illustrate the ease with which a child may slide or otherwise move the blocks about surface 16 to create learning exercises.

In FIG. 4, the teacher has created a learning exercise for the child by scrambling nine work blocks. It is the child's task, then, to match corresponding work blocks and thus learn to consciously correlate them. The child may, for instance, trace the number indentation on the block in row R1, column C1, and compare that with the finger tracing of the indentation on the block in row R2, column C2, to determine if the two feel the same. If the child recognizes their similarity, he has learned to use his tactile-kinesthetic and visual senses to match numerals. The child may also pick up some of the pegs from work blocks in row C3, learn the feel of them, and then attempt to fit them with indentations on other blocks. By using his tactile-kinesthetic and visual senses in this manner, the difficult concepts of numbers and sets will be much more easily learned.

In FIG. 5, optional operator blocks 66, 68, 70, 72 and 74 are illustrated to show how the number board apparatus of the present invention may be used to teach more difficult concepts to advanced students. For instance, by using the multiplication operator on block 66 and the equivalency symbol on work block 68, the child may teach himself the relatively advanced concept of multiplication.

Although the present invention has been described above with reference to a particular preferred embodiment, it is contemplated that many alterations and modifications will become apparent to those skilled in the art after having read this disclosure. For instance a number board apparatus may be constructed with ten rows of work blocks instead of the five rows previously described so that the child may grow familiar with all ten numerals of the arabic decimal system.

It is therefore intended that the appended claims be interpreted as covering all such alterations and modifications as fall within the true spirit and scope of the invention.

What is claimed is:

1. A number board apparatus for use in teaching visual and tactile-kinesthetic perception comprising:
    a carrying tray including,
        a rectangular base, and
        a raised border around said base;
    a set of X numeral pegs each having the shape of an arabic numeral in the series from 1 to X;
    a set of Z identically shaped and sized rectangular unit pegs, where Z is the sum of the numerals from 1 to X;
    a plurality of uniformly shaped and sized work blocks of approximately the same thickness as the height of said border and having horizontal dimensions such that a predetermined number of said blocks, arranged contiguously in X rows and Y columns, where X and Y are integers fill the interior of said tray, the upper surface of each of said work blocks in a particular column including either;
        a numerically configured indentation of approximately the same depth as the thickness of said numeral pegs and adapted to receive one of said numeral pegs, or
        a rectangular recess of approximately the same depth as the thickness of said unit pegs and adapted to receive a number of said pegs equal to one of said numerals, or
        both one of said indentations and one of said recesses, the recess in a particular block being of a size that the number of said unit pegs required to fill it is equal to the number represented by the numeral configuration of the indentaton; and
    distinguishing means by which each of said blocks may be identified as belonging in a particular column and row of said tray.

2. A number board apparatus as recited in claim 1 wherein said distinguishing means comprises distinct colorings of at least a part of the surfaces of said blocks.

3. A number board apparatus as recited in claim 1 wherein said distinguishing means comprises distinct shadings of at least a part of the surfaces of said blocks.

4. A number board apparatus as recited in claim 1 wherein said blocks are formed into five rows and five columns with corresponding blocks in each column having indentations or recesses identifying a particular one of said rows.

5. A number board apparatus as recited in claim 4 wherein the work blocks of said first, second and third columns include numeral shaped identations for the arabic numerals one through five and corresponding rectangular recesses;
    the work blocks of said fourth column contain only rectangular recesses corresponding to unit sizes one through five; and
    the work blocks of said fifth column contain only numeral shaped indentations for the arabic numerals one through five.

6. A number board apparatus as recited in claim 1 wherein each of said numerals and unit pegs is provided with a knob means for facilitating the insertion and removal of the peg means to and from said indentations and recesses.

7. A number board apparatus as recited in claim 1 and further comprising covering board means disposable over the top surfaces of a plurality of said blocks whereby the covered blocks may be removed from active physical and visual consideration by the user.

* * * * *